US009135726B2

(12) United States Patent  Kafuku

(10) Patent No.: US 9,135,726 B2
(45) Date of Patent: Sep. 15, 2015

(54) IMAGE GENERATION APPARATUS, IMAGE GENERATION METHOD, AND RECORDING MEDIUM

(71) Applicant: CASIO COMPUTER CO., LTD., Shibuya-ku, Tokyo (JP)

(72) Inventor: Shigeru Kafuku, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/010,192

(22) Filed: Aug. 26, 2013

(65) Prior Publication Data

US 2014/0064617 A1    Mar. 6, 2014

(30) Foreign Application Priority Data

Aug. 30, 2012    (JP) ................................ 2012-189406

(51) Int. Cl.
*G06T 11/00*    (2006.01)

(52) U.S. Cl.
CPC ....................................... *G06T 11/00* (2013.01)

(58) Field of Classification Search
CPC ................... G06T 11/00; G06T 11/60; G06T 2207/20112; G06K 9/00281; G06K 9/00248; G06K 9/46; G06K 9/00221; G06K 9/00268; A45D 44/005; H04N 2005/2726
USPC .................................................. 382/170, 195
See application file for complete search history.

(56) References Cited

U.S. PATENT DOCUMENTS

| 5,487,140 A | 1/1996 | Toya |
| 5,542,037 A | 7/1996 | Sato et al. |
| 5,568,599 A | 10/1996 | Yoshino et al. |
| 5,588,096 A | 12/1996 | Sato et al. |
| 5,600,767 A | 2/1997 | Kakiyama et al. |
| 5,611,037 A | 3/1997 | Hayashi |
| 5,787,419 A | 7/1998 | Sato et al. |
| 5,808,624 A | 9/1998 | Ikedo et al. |
| 5,818,457 A | 10/1998 | Murata et al. |
| 5,987,104 A * | 11/1999 | Tomimori .................. 379/93.23 |
| 6,219,024 B1 | 4/2001 | Murata |
| 2005/0264658 A1* | 12/2005 | Ray et al. ....................... 348/239 |
| 2008/0062198 A1 | 3/2008 | Takahashi et al. |
| 2008/0267443 A1 | 10/2008 | Aarabi et al. |

(Continued)

FOREIGN PATENT DOCUMENTS

| JP | 2004-145625 A | 5/2004 |
| JP | 2008-061896 A | 3/2008 |
| JP | 4986279 B2 | 7/2012 |

OTHER PUBLICATIONS

Related U.S. Appl. No. 13/849,710; First Named Inventor: Shigeru Kafuku; Title: "Image Creating Device, Image Creating Method and Recording Medium"; filed Mar. 25, 2013.

*Primary Examiner* — Edward Park
*Assistant Examiner* — Michael Vanchy, Jr.
(74) *Attorney, Agent, or Firm* — Holtz, Holtz, Goodman & Chick PC

(57) ABSTRACT

An image generation apparatus includes: an extracting section to extract characteristic information of a hair region in a face image; an image specifying section to specify a hairstyle image on the basis of the characteristic information extracted by the extracting section; and a first generating section to generate a portrait image of a face in the face image by using the hairstyle image specified by the image specifying section.

8 Claims, 7 Drawing Sheets

(56) References Cited

U.S. PATENT DOCUMENTS

| | | |
|---|---|---|
| 2009/0002479 A1* | 1/2009 | Sangberg et al. .......... 348/14.02 |
| 2009/0087035 A1 | 4/2009 | Wen et al. |
| 2010/0164987 A1 | 7/2010 | Takahashi et al. |
| 2011/0280485 A1 | 11/2011 | Sairyo et al. |
| 2012/0299945 A1 | 11/2012 | Aarabi et al. |
| 2012/0309520 A1* | 12/2012 | Evertt et al. ............... 463/31 |
| 2013/0251267 A1 | 9/2013 | Kafuku et al. |
| 2014/0233849 A1 | 8/2014 | Weng et al. |

\* cited by examiner

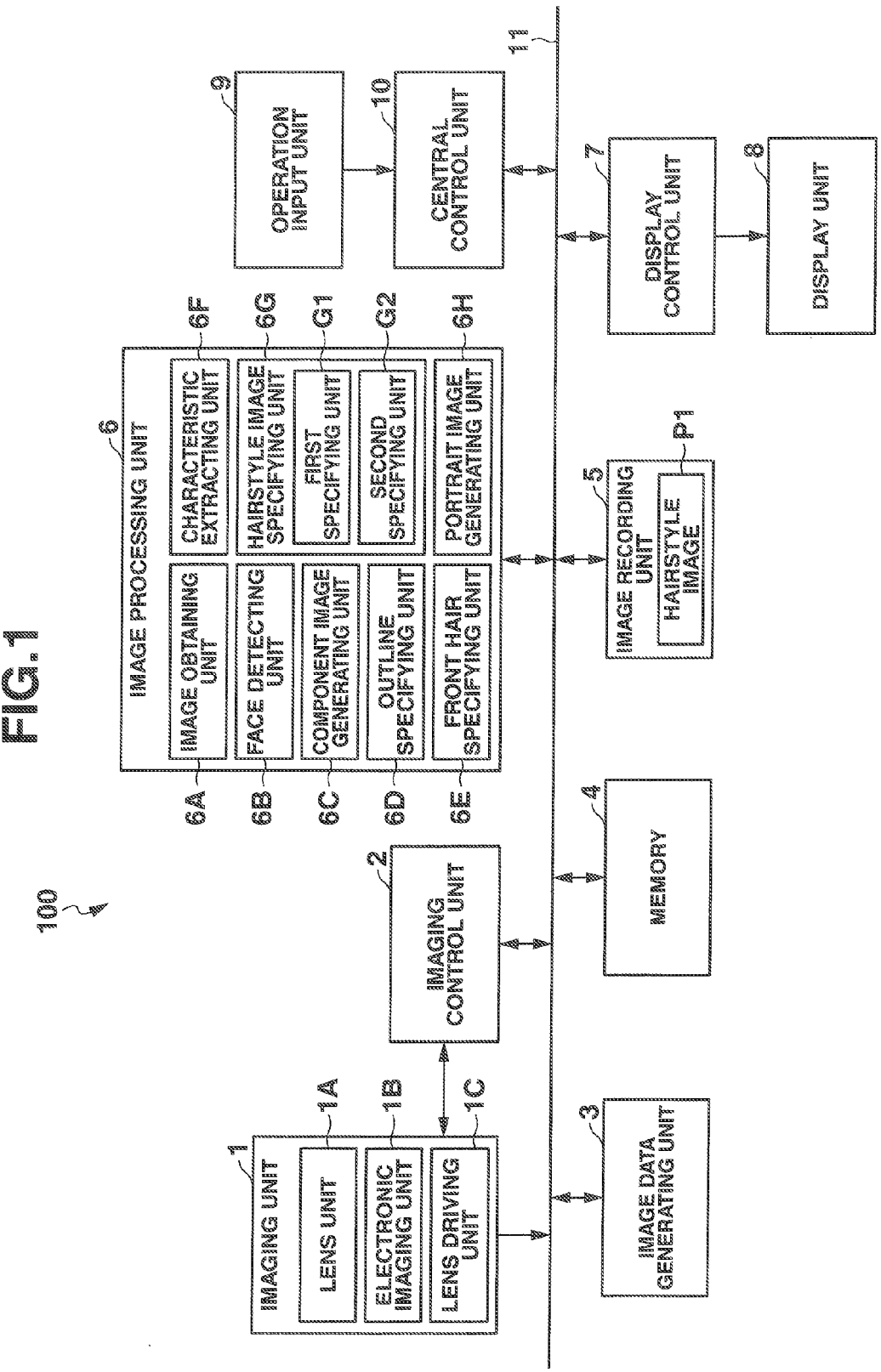

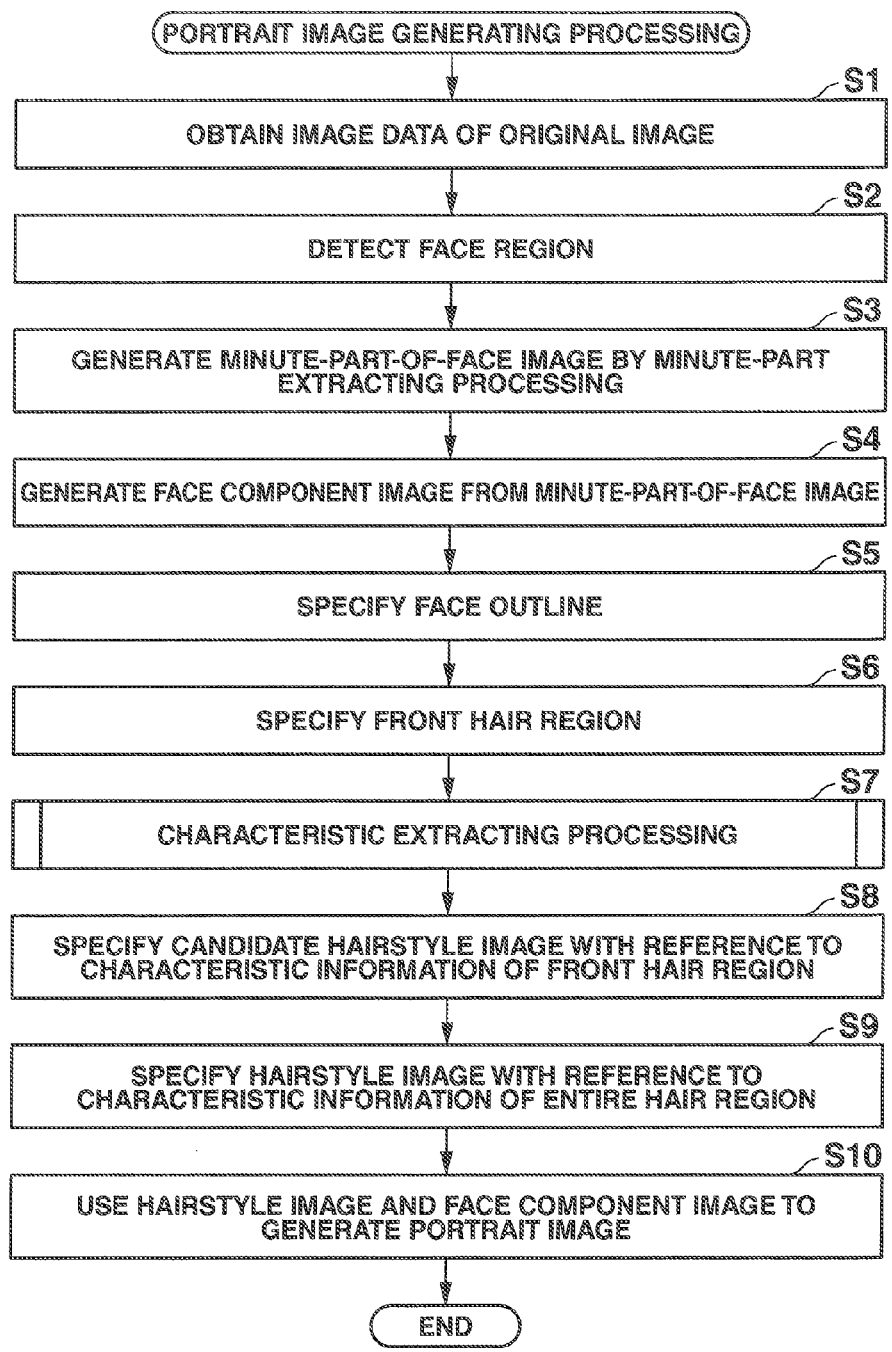

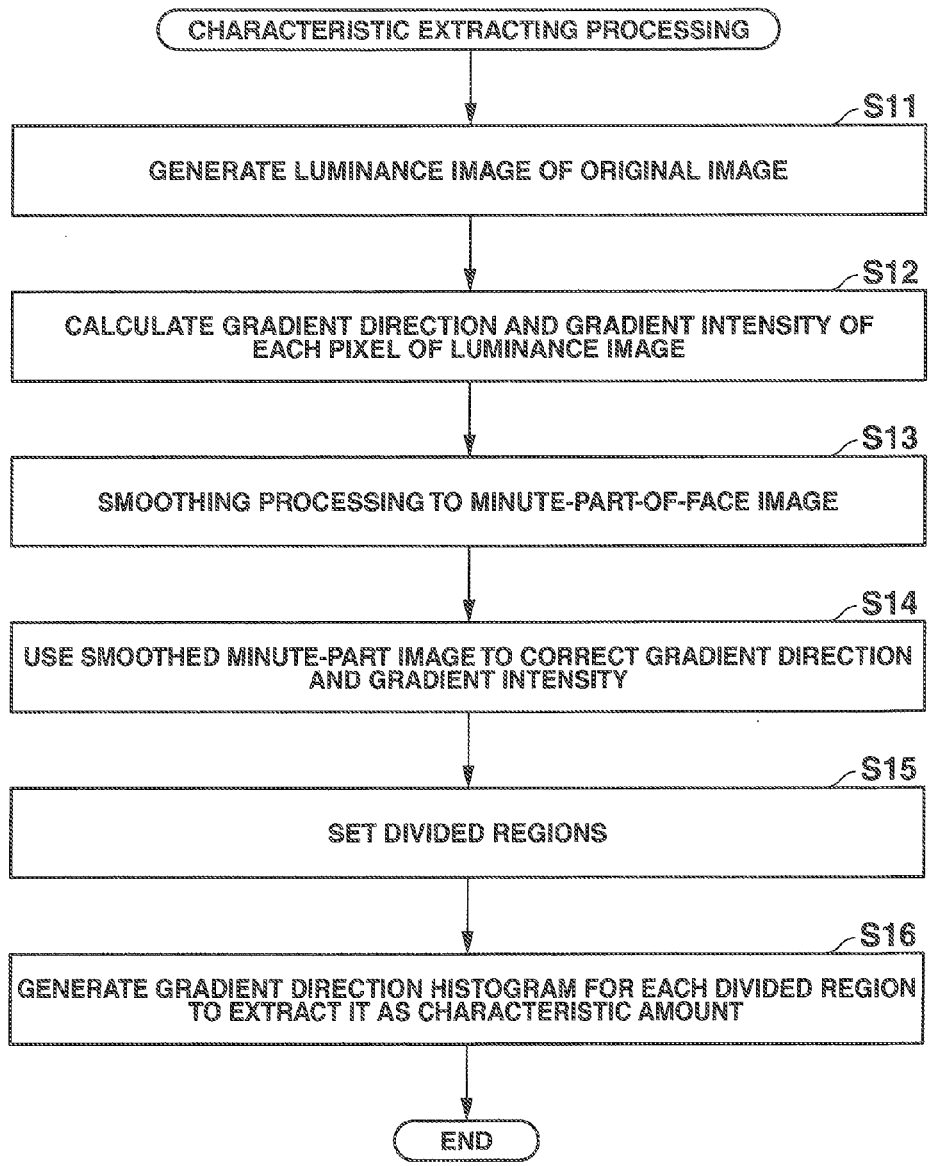

IMAGE GENERATION APPARATUS, IMAGE GENERATION METHOD, AND RECORDING MEDIUM

CROSS-REFERENCE TO RELATED APPLICATIONS

This application is based upon and claims the benefit of priority from the prior Japanese Patent Application No. 2012-189406 filed on Aug. 30, 2012, the entire contents of which are incorporated herein by reference.

BACKGROUND OF THE INVENTION

1. Field of the Invention

The present invention relates to an image generation apparatus, an image generation method, and a recording medium.

2. Description of the Related Art

Heretofore, a portrait creating apparatus which creates a portrait by using characteristic points of facial parts such as eyes, nose, mouth, ears, face outline, etc. has been known (for example, see Japanese Patent Application Laid-Open Publication No. 2004-145625).

In addition, a game apparatus which creates a character image by combining part objects previously prepared for respective regions (for example, see Japanese Patent Application Laid-Open Publication No. 2008-61896).

In the meantime, it is believed that a hairstyle has a significant impact on a portrait as compared with the eyes, nose, mouth, etc., and drastically changes the impression of the portrait.

For a system which automatically generates a portrait, considering variousness of hairstyles, a method for utilizing a color of hairs has been proposed. However, there is a possibility that extraction of a hair region from an image cannot be performed properly when the color of hairs is not a plain color.

BRIEF SUMMARY OF THE INVENTION

The object of the present invention is to provide an image generation apparatus, an image generation method, and recording medium, which can generate a more proper portrait image by considering hair characteristics of an original image.

According to an embodiment of the present invention, there is provided an image generation apparatus including: an extracting section to extract characteristic information of a hair region in a face image; an image specifying section to specify a hairstyle image on the basis of the characteristic information extracted by the extracting section; and a first generating section to generate a portrait image of a face in the face image by using the hairstyle image specified by the image specifying section.

According to an embodiment of the present invention, there is provided a method for generating an image by using an image generation apparatus, the method comprising the processes of: extracting characteristic information of a hair region in a face image; specifying a hairstyle image on the basis of the extracted characteristic information; and generating a portrait image of a face in the face image by using the specified hairstyle image.

According to an embodiment of the present invention, there is provided a recording medium which records a program readable by a computer of an image generation apparatus, which program causes the computer to exerts the functions of: extracting characteristic information of a hair region in a face image; specifying a hairstyle image on the basis of the extracted characteristic information; and generating a portrait image of a face in the face image by using the specified hairstyle image.

BRIEF DESCRIPTION OF THE SEVERAL VIEWS OF THE DRAWINGS

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention, in which drawings:

FIG. 1 is a block diagram illustrating a schematic configuration of an imaging apparatus of an embodiment to which the present invention is applied;

FIG. 2 is a flowchart illustrating an example of an operation relevant to portrait image generating processing by the imaging apparatus illustrated in FIG. 1;

FIG. 3 is a flowchart illustrating an example of an operation relevant to characteristic extracting processing in the portrait image generating processing illustrated in FIG. 2;

DETAILED DESCRIPTION OF THE PREFERRED EMBODIMENTS

Figure 4A:
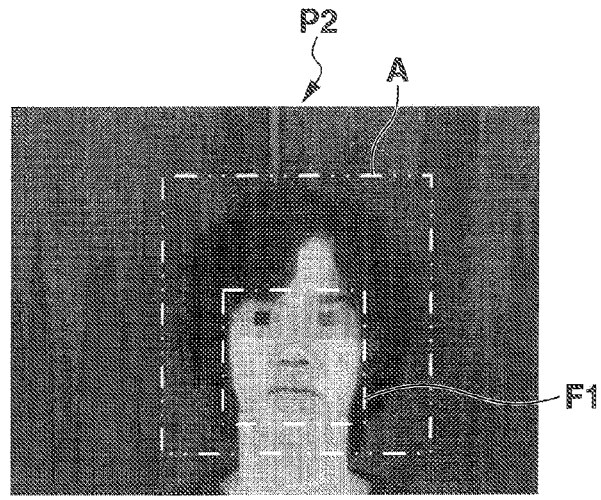
FIG. 4A is a diagram schematically illustrating an example of an image relevant to the portrait image generating processing illustrated in FIG. 2.

Hereinafter, specific embodiments of the present invention will be described with reference to the drawings. In this regard, however, the scope of the invention is not limited to the illustrated examples.

FIG. 1 is a block diagram illustrating a schematic configuration of an imaging apparatus 100 of an embodiment to which the present invention is applied.

As illustrated in FIG. 1, the imaging apparatus 100 of the embodiment is specifically includes an imaging unit 1, an imaging control unit 2, an image data generating unit 3, a memory 4, an image recording unit 5, an image processing unit 6, a display control unit 7, a display unit 8, an operation input unit 9, and a central control unit 10.

These imaging unit 1, imaging control unit 2, image data generating unit 3, memory 4, image recording unit 5, image processing unit 6, display control unit 7, and central control unit 10 are connected to one another via a bus line 11.

The imaging unit 1 takes, as an imaging section, an image of a predetermined object to generate a frame image.

Specifically, the imaging unit 1 is equipped with a lens unit 1A, an electronic imaging unit 1B, and a lens driving unit 1C.

The lens unit 1A is composed of, for example, a plurality of lenses such as a zoom lens and a focus lens.

The electronic imaging unit 1B is composed of, for example, an image sensor (imaging element) such as a Charge Coupled Device (CCD) and Complementary Metal-oxide Semiconductor (CMOS). The electronic imaging unit 1B converts an optical image which has passed through various lenses of the lens unit 1A into a two-dimensional image signal.

The lens driving unit 1C is equipped with, for example, a zoom driving unit which causes the zoom lens to move along an optical axis direction, a focusing driving unit which causes the focus lens to move along the optical axis direction, etc., though illustrations thereof are omitted.

The imaging unit 1 can includes a diaphragm (not illustrated) which adjusts an amount of light passing through the lens unit 1A, in addition to the lens unit 1A, the electronic imaging unit 1B, and the lens driving unit 1C.

The imaging control unit 2 controls imaging of an object by the imaging unit 1. Concretely, the imaging control unit 2 is equipped with a timing generator, a driver, etc., though illustrations thereof are omitted. The imaging control unit 2 drives, by using the timing generator and the driver, the electronic imaging unit 1B to perform scanning, and to convert the optical image which has passed through the lens unit 1A into the two-dimensional image signal at predetermined intervals, and causes the frame image of each screen to be read out from an imaging region of the electronic imaging unit 1B to be output to the image data generating unit 3.

The imaging control unit 2 can cause the electronic imaging unit 1B, in stead of the focus lens of the lens unit 1A, to move along the optical axis to adjust a focusing position of the lens unit 1A.

The imaging control unit 2 can also perform a control to adjust a condition for imaging a specific object, such as Auto Focus (AF) processing, Auto Exposure (AE) processing, and Auto White Balance (AWB) processing.

The image data generating unit 3 arbitrary performs gain adjustment for each color component of RGB of an signal of the frame image, which signal has an analog value and is transferred from the electronic imaging unit 1B, and after that, causes a sample/hold circuit (not illustrated) to sample and hold the signal, causes an A/D converter (not illustrated) to convert the signal into digital data, causes a color process circuit (not illustrated) to perform colorization processing including pixel interpolation processing and gamma correction processing, and then generates a luminance signal Y and color difference signals Cb, Cr (YUV data) which have digital values.

The luminance signal Y and the color difference signals Cb, Cr output from the color process circuit are subjected to DMA transfer to the memory 4, which is used as a buffer memory, via a DMA controller not illustrated.

The memory 4 is composed of, for example, a Dynamic Random Access Memory (DRAM) or the like, and temporarily stores data and the like to be processed by each unit such as the image processing unit 6 and the central control unit 10 of the imaging apparatus 100.

The image recording unit 5 is composed of, for example, a non-volatile memory (flash memory) or the like, and records the image data to be recorded, which data has been encoded in a predetermined compression format (for example, JPEG format, etc.) by an encoding unit (not illustrated) of the image processing unit 6.

Figure 7A:
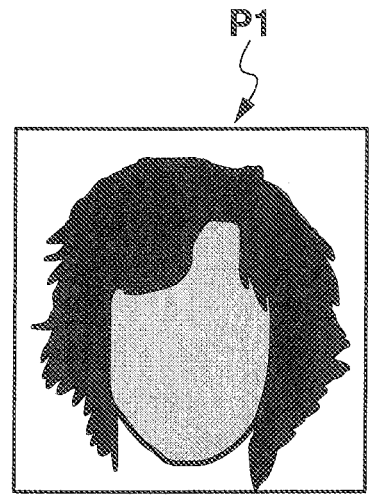
FIG. 7A is a diagram schematically illustrating an example of an image relevant to the portrait image generating processing illustrated in FIG. 2.
Figure 7B:
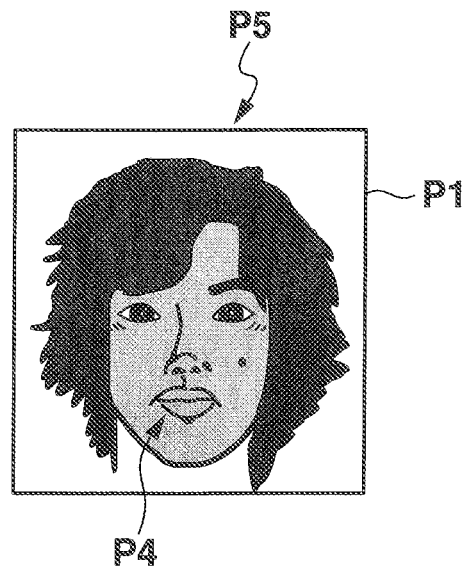
FIG. 7B is a diagram schematically illustrating an example of an image relevant to the portrait image generating processing illustrated in FIG. 2.

The image recording unit 5 records pieces of image data of hairstyle images P1, . . . of the predetermined number (see FIG. 7A).

Each piece of image data of hairstyle images P1, . . . is, for example, an image which schematically represents an outline of human hairs, and is correlated to characteristic information of an entire hair region including a front hair region (hair-tip region).

Here, each piece of image data of hairstyle images P1, . . . can be formed, for example, by performing a process (details thereof will be described later) using an Active Appearance Model (AAM) with respect to a face region F1 detected by later-described face detecting processing, deleting face components (for example, eyes, nose, mouth, eyebrows, etc.) existing inside of an outline of a jaw of a face, then drawing lines along the face outline and/or tip portions of hairs, and painting a skin portion inside the face outline and/or the hairs with predetermined colors. Drawing the lines along the face outline and/or the tip portions of the hairs can be manually performed on the basis of a predetermined operation in the operation input unit 9 by a user, or can be automatically performed under a control of a CPU of the central control unit 10.

As the characteristic information of the hair region, for example, there can be adopted an amount of characteristics (details thereof will be described later) obtained by generating a gradient direction histogram of the luminance signal Y of the image data of an original image from which each hairstyle image P1 is generated.

Each piece of image data of hairstyle images P1, . . . is also correlated to mask information for designating a front hair region F2 from the hair region, in addition to the characteristic information of the entire hair region. Concretely, each piece of image data of hairstyle images P1, . . . is recorded so as to be correlated to characteristic information of the front hair region F2 of the hair region through the mask information.

Each piece of image data of hairstyle images P1, . . . can be correlated to a shape (details thereof will be described later) of the face outline, which is of the characteristic information of the face in the original image from which each hairstyle image P1 is generated. In other words, each piece of image data of the hairstyle images P1, . . . can be image data including the face outline.

To the image data of hairstyle images P1, . . . , various styles of front hairs such as front hairs parted on the left, front hairs separated in the middle, front hairs parted to the right, no part (front hairs let down), and no part (a forehead let uncovered) can be correlated, respectively.

The image recording unit 5 can have a configuration where a recording medium (not illustrated) is attachable/detachable to/from the image recording unit 5 so that writing/reading of data in/from the recording medium attached to the image recording unit 5 is controlled thereby.

The image processing unit 6 includes an image obtaining unit 6A, a face detecting unit 6B, a component image generating unit 6C, an outline specifying unit 6D, a front hair specifying unit 6E, a characteristic information extracting unit 6F, a hairstyle image specifying unit 6G, and a portrait image generating unit 6H.

Each unit of the image processing unit 6 is composed of, for example, a predetermined logic circuit, but such configuration is a mere example and the present invention is not limited thereto.

The image obtaining unit 6A obtains the image which is to be subjected to portrait image generating processing.

Concretely, the image obtaining unit 6A obtains the image data of the original image (for example, a photographic image, etc.) P2. Concretely, the image obtaining unit 6A obtains from the memory 4 a copy of the image data (RGB data and/or YUV data) of the original image P2, which has been generated by the image data generating unit 3 by imaging an object by the imaging unit 1 and the imaging control unit 2, and/or obtains a copy of the image data of the original image P2 recorded in the image recording unit 5 (see FIG. 4A).

Incidentally, later-described processes by the image processing unit 6 can be performed with respect to the image data of the original image P2 itself, or with respect to reduced image data of a predetermined size (for example, VGA size, etc.) obtained by reducing the image data of the original image P2 at a predetermined ratio, as appropriate.

The face detecting unit 6B detects a face region F1 (see FIG. 4A) from the original image P2 which is to be processed.

Concretely, the face detecting unit 6B detects the face region F1 including a face from the original image P2 obtained by the image obtaining unit 6A. More specifically, the face detecting unit 6B obtains the image data of the original image P2, which has been obtained as the image to be subjected to the portrait image generating processing by the image obtaining unit 6A, and performs a predetermined face detecting processing with respect to the obtained image data to detect the face region F1. Then, the face detecting unit 6B cuts out a region A (see FIG. 4A) of a predetermined size surrounding the face region F1, and sets the cut region to a face region image.

Since the face detecting processing is a known technique, the detailed description thereof is omitted here.

Figure 4B:
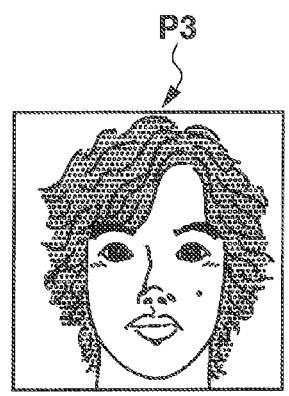
FIG. 4B is a diagram schematically illustrating an example of an image relevant to the portrait image generating processing illustrated in FIG. 2.
Figure 4C:
FIG. 4C is a diagram schematically illustrating an example of an image relevant to the portrait image generating processing illustrated in FIG. 2.

The component image generating unit 6C generates a face component image P4 (see FIG. 4C) representing a facial principal components.

Concretely, the component image generating unit 6C generates the face component image P4 relevant to the facial principal components in the original image P2 (see FIG. 4A) obtained by the image obtaining unit 6A. More specifically, the component image generating unit 6C performs a minute-part extracting processing with respect to the face region image containing the face region F1 of the original image P2 therein, and generates a minute-part-of-face image P3 (see FIG. 4B) representing face components such as eyes, nose, mouth, eyebrows, hairs, and face outline, with lines. For example, the component image generating unit 6C generates the minute-part-of-face image P3 by process using the AAM, as the minute-part extracting processing. In addition, the component image generating unit 6C performs the minute-part extracting processing with respect to the face region F1 detected from the image data of the original image P2 by the face detecting unit 6B.

Here, the AAM is a method of modelization of visual events, which is processing to model the image of the arbitrary face region F1. For example, the component image generating unit 6C previously registers a result of statistical analysis of positions and/or pixel values (for example, luminance values) of predetermined characteristic regions (for example, corners of eyes, tip of nose, face line, etc.) in a plurality of sample face images, in a predetermined registration section. Then, the component image generating unit 6C sets, with reference to the positions of the characteristic regions, a shape model representing a face shape and/or a texture model representing "Appearance" in an average shape, and models the image (face region image) of the face region F1 by using these models. Thus, the component image generating unit 6C generates the minute-part-of-face image P3 in which a principal composition of the original image P2 is extracted and represented with lines.

As the minute-part-of-face image P3, there can be adopted a binary image in which a black pixel is set to a first pixel value (for example, "0(zero)" etc.) and a while pixel is set to a second pixel value (for example, "255" etc.) different from the first pixel value.

Moreover, the component image generating unit 6C specifies the face outline in the face region F1 by the minute-part extracting processing, and generates the face component image P4 (see FIG. 4C) representing the face components existing inside of the face outline and the face components contacting with the face outline, with lines.

Specifically, the component image generating unit 6C specifies the pixels contacting with the face outline in the minute-part-of-face image P3, and deletes, among the pixels continuous with the above pixels, a pixel assembly existing outside of the face outline. In other words, the component image generating unit 6C deletes a part of the minute-part-of-face image P3, which part exists outside of the face outline, and leaves a part of the minute-part-of-face image P3, which part exists inside of the face outline, to generate the face component image P4 including, for example, part images of principal face components such as eyes, nose, mouth, eyebrows, etc.

Here, the component image generating unit 6C can extract and obtain information relevant to a relative positional relationship of the part images of the face components in XY plain space, and/or information relevant to a coordinate position.

Although the process using the AAM is illustrated as the minute-part extracting processing, it is a mere example. The present invention is not limited to the above, and can be arbitrary changed.

For example, as the minute-part extracting processing, edge extracting processing and/or anisotropic diffusion processing can be performed to generate the face component image P4 including the part images of the face components. Specifically, for example, the component image generating unit 6C can execute a differential operation with respect to the image data of the original image P2 by using a predetermined differential filter (for example, a high-pass filter, etc.) to perform edge detecting processing to detect as an edge a point at which a luminance value, color, and/or density change precipitously. The component image generating unit 6C can also perform the anisotropic diffusion processing with respect to the image data of the original image P2, by using a predetermined anisotropic diffusion filter, by which processing the image data is smoothed in a state where weighting in a tangential direction of a linear edge is different from weighting in a vertical direction of the edge.

The outline specifying unit 6D specifies a face outline W in the original image P2.

Concretely, the outline specifying unit 6D specifies the face outline W in the original image P2 obtained by the image obtaining unit 6A. More specifically, the outline specifying unit 6D specifies a part corresponding to the face outline specified in the minute-part-of-face image P3 by the component image generating unit 6C, inside of the face region image (image in the region A) including the face region F1 of the original image P2.

Here, as the shape of the face outline W, for example, there can be adopted a substantially U-letter shape (see FIG. 5A) which connects right and left temples to each other with a line which passes through a jaw. It is a mere example, and the present invention is not limited thereto. The present invention can adopt also an elliptical shape which connects right and left temples, jaw, and forehead to one another with a line, especially the elliptical shape which matches with an outline of a jaw.

The front hair specifying unit 6E specifies the front hair region F2 in the original image P2.

Concretely, the front hair specifying unit 6E specifies the front hair region F2 with reference to a predetermined position in the face outline W specified by the outline specifying unit 6D. More specifically, the front hair specifying unit 6E specifies a predetermined range on the basis of the positions corresponding to the right and left temples constituting the face outline W, which has been specified by the outline specifying unit 6D, as the front hair region F2 (see FIG. 5A). Then, the front hair specifying unit 6E generates the mask information for designating the specified front hair region F2.

The characteristic information extracting unit 6F extracts the characteristic information from the hair region of the original image P2.

Concretely, the characteristic information extracting unit 6F extracts, from the hair region of the original image P2 obtained by the image obtaining unit 6A, the characteristic information of at least the hair-tip region (for example, the front hair region F2). More specifically, the characteristic information extracting unit 6F performs characteristic extracting processing to select and extract a block region (characteristic point) having a high amount of characteristics in the hair region.

For example, the characteristic information extracting unit 6F performs the characteristic extracting processing with respect to the pixels constituting the entire hair region of the original image P2, as the minute-part extracting processing, and extracts the characteristic information of the entire hair region.

Here, as the characteristic extracting processing, there can be adopted a processing to extract an amount of characteristic (an amount of shape characteristics), which is obtained by generating a histogram of a luminance (the luminance signal Y) gradient direction of the original image P2 to be processed. More specifically, the characteristic information extracting unit 6F calculates a gradient direction (for example, nine directions obtained by dividing the range of zero(0) to 179 degrees into nine sections, an angle between neighboring directions being 20 degrees, etc.) and a gradient intensity (for example, 8 bit: 0-255) of each pixel of the luminance image converted from the original image P2 to be subjected to the characteristic extracting processing. Then, the characteristic information extracting unit 6F divides the luminance image, from which the gradient direction and the gradient intensity of each pixel have been calculated, at a predetermined ratio (for example, a vertical direction: 16×a horizontal direction: 16, etc.), after that, calculates integrated value of gradient intensities for each gradient direction to generate the gradient direction histogram, and extracts it as the amount of characteristic (characteristic information).

At that time, the characteristic information extracting unit 6F can use the mask information generated by the front hair specifying unit 6E to extract only the characteristic information of the front hair region F2 of the hair region of the original image P2 (face region image).

Incidentally, since the characteristic extracting processing to generate the gradient direction histogram is a known technique, the detailed description thereof is omitted here. In addition, the number of gradient directions and the number of gradations of gradient intensity are mere examples. The present invention is not limited to the above, and can be arbitrary changed.

The hairstyle image specifying unit 6G specifies the hairstyle image P1 on the basis of the characteristic information extracted by the characteristic information extracting unit 6F.

Concretely, from among the hairstyle images P1, . . . each being recorded so as to be correlated to the characteristic information of the hair region in the image recording unit 5, the hairstyle image specifying unit 6G specifies the hairstyle image P1 corresponding to the characteristic information of the hair region of the original image P2 extracted by the characteristic information extracting unit 6F. The hairstyle image specifying unit 6G includes a first specifying unit G1 and a second specifying unit G2.

The first specifying unit G1 specifies candidate hairstyle images of a predetermined numbers.

Concretely, from among the hairstyle images P1, . . . each being recorded so as to be correlated to the characteristic information of the front-hair region (hair-tip region) F2 in the image recording unit 5, the first specifying unit G1 specifies the candidate hairstyle images of the predetermined numbers on the basis of the characteristic information of the front hair region F2 extracted by the characteristic information extracting unit 6F. More specifically, the first specifying unit G1 normalizes the characteristic information (gradient direction histograms) of the front hair region corresponding to each of the respective hairstyle images P1, . . . recorded in the image recording unit 5, normalizes the characteristic information (gradient direction histogram) of the front hair region F2 designated by the mask information among the hair regions of the original images P2, compares the pieces of normalized information with each other, and rearranges the hairstyle images P1, . . . , with reference to a matching degree, in the order of the matching degree from highest to lowest up to a predetermined ranking (for example, tenth, etc.) Then the first specifying unit G1 specifies the most common style of the front hairs (see FIG. 6) among the images up to the predetermined ranking, and specifies the hairstyle images P1 of the most common style of the front hairs as the candidate hairstyle images among the hair style images P1, . . . recorded in the image recording unit 5.

Figure 6:
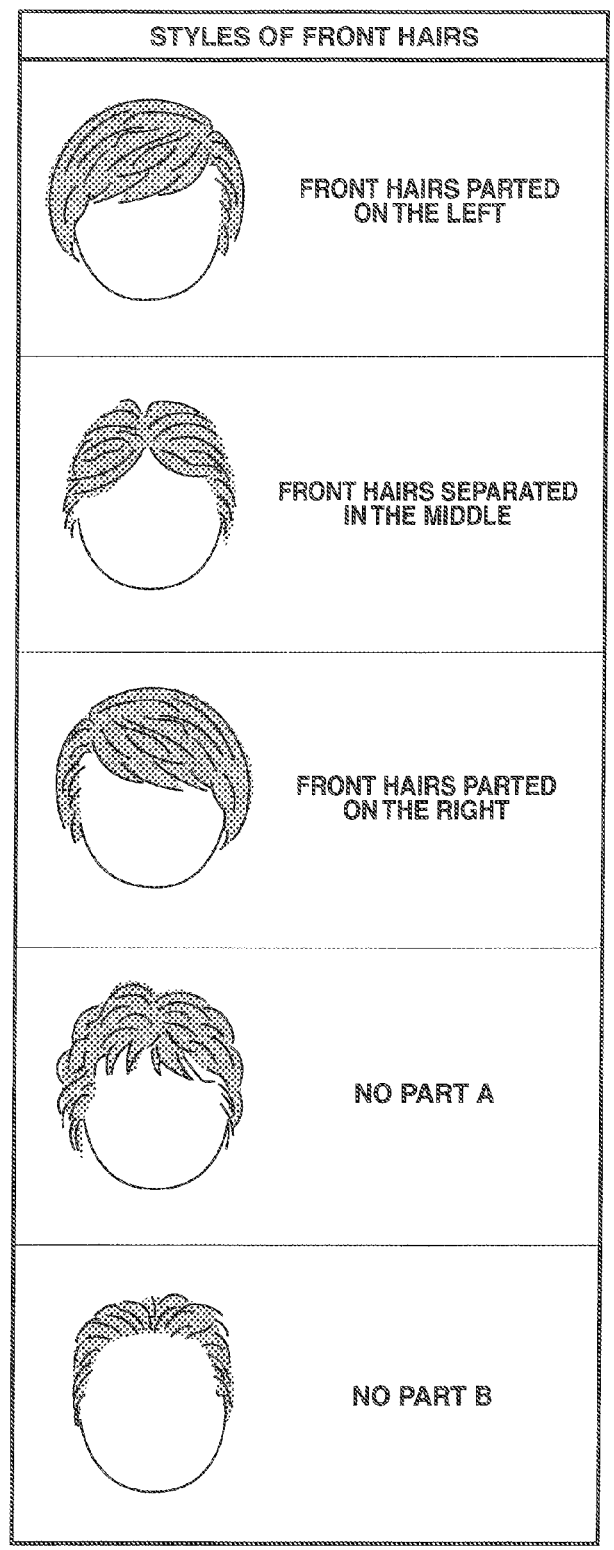
FIG. 6 is a diagram schematically illustrating examples of styles of front hairs relevant to the portrait image generating processing illustrated in FIG. 2.

Although FIG. 6 illustrates the style of the front hairs such as front hairs parted on the left, front hairs separated in the middle, front hairs parted to the right, no part A, and no part B, they are mere examples, and the present invention is not limited thereto and can be arbitrary changed.

The second specifying unit G2 specifies the hairstyle image P1 corresponding to the characteristic information of the hair region of the original image P2, from among the candidate hairstyle images of a predetermined number.

Concretely, the second specifying unit G2 specifies the hairstyle image P1 on the basis of the characteristic information of the entire hair region extracted by the characteristic information extracting unit 6F, from among the candidate hairstyle images of a predetermined number specified by the first specifying unit G1. More specifically, the second specifying unit G2 normalizes the characteristic information (gradient direction histogram) of the hair region corresponding to each of the candidate hairstyle images of a predetermined number specified by the first specifying unit G1, normalizes the characteristic information (gradient direction histogram) of the hair region of the original image P2, compares the pieces of normalized information with each other, and rearrange the hairstyle images P1, . . . , with reference to a matching degree, in the order of the matching degree from highest to lowest up to a predetermined ranking (for example, tenth, etc.)

Here, the second specifying unit G2 can automatically specify one(1) hairstyle image P1 (see FIG. 7A) having the highest matching degree, or can specify the hairstyle image P1 desired by a user on the basis of a predetermined operation in the operation input unit 9 by a user.

The portrait image generating unit 6H generates the portrait image P5 on the basis of the hairstyle image P1 and the face component image P4.

Concretely, the portrait image generating unit 6H generates the portrait image P5 by using the image data of the hairstyle image P1 specified by the hairstyle image specifying unit 6G. More specifically, the portrait image generating unit 6H specifies, inside the face outline W in the hairstyle image P1, a position where each face component such as eyes, nose, mouth, eyebrows, etc. is superimposed, and generates the image data of the portrait image P5 which represents the portrait of the original image P2 by superimposing the part images of face components on the specified position.

Incidentally, the portrait image generating unit 6H can generate the image in which the predetermined parts (for example, face components such as eyes, mouth, eyebrows, etc.) are colored predetermined colors.

The display control unit 7 performs a control to read out the image data, which is temporarily stored in the memory 4 and is to be displayed, and causes the display unit 8 to display the read-out image data.

Concretely, the display control unit 7 is equipped with a Video Random Access Memory (VRAM), a VRAM controller, a digital video encoder, etc. The digital video encoder periodically reads out the luminance signal Y and the color difference signals Cb, Cr, which have been read out from the memory 4 under the control of the central control unit 10 and stored in the VRAM (not illustrated), from the VRAM via the VRAM controller, and generates a video signal based on these pieces of data to output the same to the display unit 8.

The display unit 8 is, for example, a liquid crystal display panel, and displays the image imaged by the imaging unit 1 and the like on the basis of the video signal from the display control unit 7. Specifically, the display unit 8 displays a live-view image, in a still-image imaging mode or a moving image imaging mode, while continually updating the frame images generated by imaging of an object by the imaging unit 1 and the imaging control unit 2 at a predetermined frame rate. The display unit 8 also displays the image (REC-view image) to be recorded as a still image, and/or displays the image which is currently being recorded as a moving image.

The operation input unit 9 is used for executing a predetermined operation of the imaging apparatus 100. Specifically, the operation input unit 9 is equipped with an operation unit such as a shutter button relevant to an instruction to image an object, a selection determination button relevant to an instruction to select an imaging mode and/or functions, etc., a zoom button relevant to an instruction to adjust an amount of zoom, and so on, which are not illustrated, and outputs a predetermined operation signal to the central control unit 10 according to an operation of each button of the operation unit.

The central control unit 10 controls the respective units of the imaging apparatus 100. Specifically, the central control unit 10 is, though illustration is omitted, equipped with a Central Processing Unit (CPU), etc., and performs various control operations according to various processing program (not illustrated) for the imaging apparatus 100.

Next, the portrait image generating processing by the imaging apparatus 100 will be described with reference to FIGS. 2-7.

FIG. 2 is a flowchart illustrating an example of the operation of the portrait image generating processing.

The portrait image generating processing is processing to be executed by each unit, especially the image processing unit 6 of the imaging apparatus 100 under the control of the central control unit 10, when a portrait image generating mode is instructed to be selected among a plurality of operation modes displayed in a menu screen, on the basis of a predetermined operation on the selection determination button of the operation input unit 9 by a user.

The image data of the original image P2 to be subjected to the portrait image generating processing, and the image data of the hairstyle image P1 to be used for generating the portrait image P5, are previously recorded in the image recording unit 5.

As illustrated in FIG. 2, the image data of the original image P2 (see FIG. 4), which has been designated on the basis of a predetermined operation in the operation input unit 9 by a user, is firstly read out from among the pieces of image data recorded in the image recording unit 5, and the image obtaining unit 6A of the image processing unit 6 obtains the image data read out as a processing object of the portrait image generating processing (Step S1).

Subsequently the face detecting unit 6B performs the predetermined face detecting processing with respect to the image data of the original image P2, obtained as the processing object by the image obtaining unit 6A, to detect the face region F1 (Step S2).

Then, the component image generating unit 6C performs the minute-part extracting processing (for example, a process using the AAM, etc.) with respect to the face region image including the detected face region F1, and generates the minute-part-of-face image P3 (see FIG. 4B) in which the face components such as eyes, nose, mouth, eyebrows, hairs, and face outline are represented with lines, for example (Step S3). The component image generating unit 6C specifies the face outline in the face region F1 by the minute-part extracting processing, and generates the face component image P4 which includes the face components existing inside the face outline and the face components contacting with the face outline, namely, the part images of the facial principal components such as eyes, nose, mouth, and eyebrows (Step S4; see FIG. 4C).

Figure 5A:
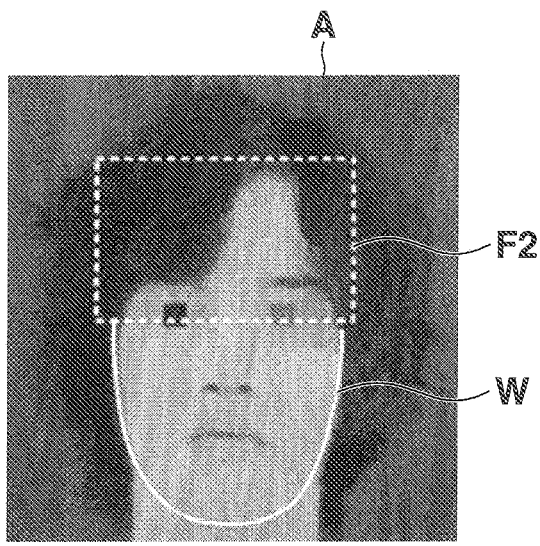
FIG. 5A is a diagram schematically illustrating an example of an image relevant to the portrait image generating processing illustrated in FIG. 2.

Next, the outline specifying unit 6D specifies, inside the face region image of the original image P2, the portion corresponding to the face outline specified in the minute-part-of-face image P3 by the component image generating unit 6C, as the face outline W (Step S5; see FIG. 5A). Then, the front hair specifying unit 6E specifies, inside the face region image of the original image P2, a predetermined range on the basis of the predetermined position (for example, positions corresponding to right and left temples) in the face outline W specified by the outline specifying unit 6D, as the front hair region F2 (Step S6; see FIG. 5A). After that, the front hair specifying unit 6E generates the mask information for designating the specified front hair region F2.

Subsequently, the characteristic information extracting unit 6F performs characteristic extracting processing (see FIG. 3) (Step S7).

Hereinafter, the characteristic extracting processing will be described in detail with reference to FIG. 3. FIG. 3 is a flowchart illustrating an example of the operation relevant to the characteristic extracting processing.

Figure 5B:
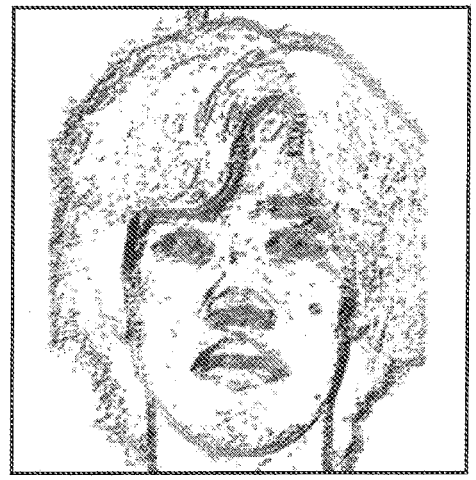
FIG. 5B is a diagram schematically illustrating an example of an image relevant to the portrait image generating processing illustrated in FIG. 2.

As illustrated in FIG. 3, the characteristic information extracting unit 6F converts a copy of the image data (for example, RGB data) of the face region image of the original image P2 into the YUV data to generate the luminance image from the luminance signal Y (Step S11). Then, the characteristic information extracting unit 6F calculates the gradient direction and the gradient intensity of each pixel of the luminance image (Step S12). For example, the characteristic information extracting unit 6F sets, as the gradient directions, the nine directions each of which is of 20 degrees and which are obtained by dividing the range of zero(0) to 179 degrees into nine sections, and calculates the gradient intensity using 256 gradations (8 bit) of zero(0) to 255 (see FIG. 5B). FIG. 5B is the image in which each pixel is represented with a representative pixel value corresponding to any one of the gradient directions each of which is of 20 degrees.

Next, the characteristic information extracting unit 6F performs smoothing processing to smooth the color by using a filter (for example, Gaussian filter, etc.) of a predetermined size, with respect to a copy of the image data of the minute-part-of-face image P3 corresponding to the face region image of the original image P2 (Step S13). The characteristic information extracting unit 6F then corrects the gradient direction and the gradient intensity of each pixel of the luminance image of the face region image by using the image data of the minute-part-of-face image P3 after the smoothing processing (Step S14). For example, the characteristic information extracting unit 6F regards a white pixel of the minute-part-of-face image P3 after the smoothing processing as the one having no edge or the one having an edge of low intensity, and performs correction so that each pixel of the luminance image, from which pixel the gradient direction and the gradient intensity have been extracted, and which pixel corresponds to the while pixel, has no gradient.

Next, the characteristic information extracting unit 6F divides the face region image, for which the gradient direction and the gradient intensity of each pixel have been calculated, at a predetermined rate (for example, vertical direction: 16×horizontal direction: 16, etc.) to set a plurality of divided regions (Step S15), then generates the gradient direction histogram for each divided region (processing object region), and extracts it as the amount of characteristics (characteristic information).

Then, the characteristic extracting processing is terminated.

Returning to FIG. 2, the first specifying unit G1 of the hairstyle image specifying unit 6G specifies, among the hairstyle images P1, . . . recorded in the image recording unit 5, the candidate hairstyle images of a predetermined number on the basis of the characteristic information of the front hair region F2 of the hair region extracted by the characteristic extracting processing (Step S8).

For example, the first specifying unit G1 obtains the characteristic information (gradient direction histogram) of the front hair region corresponding to each of the hairstyle images P1, from the image recording unit 5, obtains the characteristic information (gradient direction histogram) of the front hair region F2 of the original image P2, and after that, normalizes each of the obtained information to compare them with each other. The first specifying unit G1 then specifies, among the hairstyle images P1, . . . arranged in the order of the matching degree with respect to the characteristic information of the front hair region F2 of the original image P2, from highest to lowest, up to a predetermined ranking (for example, tenth, etc.), the most common style (for example, front hairs parted on the left, etc.; see FIG. 6) of the front hairs. After that, first specifying unit G1 specifies, among the hairstyle images P1, . . . recorded in the image recording unit 5, a predetermined number of the hairstyle images P1, . . . of the most common style of the front hairs as the candidate hairstyle images.

At that time, it is possible to judge whether or not the rate of the number of the hairstyle images P1, . . . of the most common style of the front hairs, which have been specified among the hairstyle images P1, . . . up to the predetermined ranking of the matching degree, is equal to or more than a predetermined percent (for example, 50 percent, etc.), and only when it is judged that the rate is equal to or more than the predetermined percent, to cause the first specifying unit G1 to specify the hairstyle images P1 of the most common style of the front hairs as the candidate hairstyle images.

It is also possible to previously determine whether the face of the original image P2 is the one of male or of female on the basis of a predetermined operation in the operation input unit 9 by a user, and to cause the first specifying unit G1 to obtain the characteristic information of the front hair region F2 of the hairstyle image P1 corresponding to the determined sex from the image recording unit 5.

Next, the second specifying unit G2 specifies, among the candidate hairstyle images of the predetermined number specified by the first specifying unit G1, the hairstyle image P1 on the basis of the characteristic information of the entire hair region extracted by the character extracting processing (Step S9).

For example, the second specifying unit G2 obtains the characteristic information (gradient direction histogram) of the entire hair region with respect to each of the candidate hairstyle images of the predetermined number, obtains the characteristic information (gradient direction histogram) of the entire hair region of the original image P2, normalizes each of the pieces of obtained information, and compares them with each other. The second specifying unit G2 then automatically specifies the hairstyle image P1 (see FIG. 7A) having the highest matching degrees with respect to the characteristic information of the entire hairstyle region of the original image P2. At that time, the second specifying unit G2 can rearrange the hairstyle images P1, . . . in the order of the matching degree from highest to lowest up to a predetermined ranking (for example, tenth, etc.), and after that, can specify among these hairstyle images P1, . . . the hairstyle image P1 desired by a user on the basis of a predetermined operation by a user.

Subsequently, the portrait image generating unit 6H generates the portrait image P5 by using the hairstyle image P1 and the face component image P4 (Step S10). Specifically, the portrait image generating unit 6H specifies, inside the face outline W of the hairstyle image P1 specified by the hairstyle image specifying unit 6G, the positions of the face component image P4 generated by the component image generating unit 6C at which the part images of face components such as eyes, nose, mouth, eyebrows, etc. are superimposed, and makes the part images of face components superimposed on the specified positions to generate the image data of the portrait image P5 which represent the original image P2 as the portrait thereof (see FIG. 7B). The image recording unit 5 then obtains the image data (YUV data) of the portrait image P5 generated by the portrait image generating unit 6H to record the same.

Thus, the portrait image generating processing is terminated.

As described above, according to the imaging apparatus 100 of the embodiment, since the hairstyle image P1 corresponding to the characteristic information of the front hair region F2 of the hair region in the original image P2 is specified from among the hairstyle images P1, . . . , each of which represents the hair outline and is recorded so as to be correlated to the characteristic information of the front hair region (hair-tip region) in the image recording unit 5, so that the portrait image P5 of the face is generated by using the specified hairstyle image P1, the hairstyle image P1 corresponding to the hairstyle in the original image P2 can be specified in view of the characteristics of the hair tips of the original image P2. Accordingly, more proper portrait image P5 can be generated.

Although there is a possibility that the hairstyle in the portrait makes a strong impression on the portrait in comparison with the other face parts such as eyes, nose, mouth, etc., in the embodiment, a natural hairstyle image P1 can be specified by considering the characteristics of the hair tips, in which image P1 the appearance of the hairstyle does not stray from that of the original image P2, and accordingly more proper portrait image P1 can be specified by using the hairstyle image P1. Specifically, the portrait image P5 can be generated based on the specified hairstyle image P1, and the face component image P4 relevant to the facial principal components in the original image P2.

Moreover, since more proper hairstyle image P1 can be specified even when a plurality of hairstyle images P1, . . . are recorded in the image recording unit 5, an operation can be prevented from being complicated, for example, like a method of manually selecting the hairstyle, which is desired by a user, from among the large number of prepared hairstyle templates.

Furthermore, since the predetermined number of the candidate hairstyle images are specified among the hairstyle images P1, . . . , each of which is recorded so as to be correlated to the characteristic information of the front hair region (hair-tip region) in the image recording unit 5, on the basis of the characteristic information of the front hair region F2 extracted from the original image P2, and since the hairstyle image P1 is specified among the predetermined numbers of the candidate hairstyle images on the basis of the characteristic information of the entire hair region extracted from the original image P2, it is possible to narrow down, among the hairstyle images P1, . . . recorded in the image recording unit 5, the number of candidate hairstyle images to a predetermined number in view of the characteristics of the hair tips of the original image P2, and to specify, among the predetermined number of the candidate hairstyle images, more proper hairstyle image P1 in view of the characteristics of the whole hairs of the original image P2.

Specifically, since the hairstyle images P1, . . . each corresponding to the characteristic information of the front hair region F2 extracted from the original image P2 are specified among the hairstyle images P1, . . . recorded in the image recording unit 5, and since the predetermined number of the hairstyle images P1, . . . including the most common type of the front hairs are specified as the candidate hairstyle images, it is possible to regard the hairstyle image P1, in which the appearance of the front hairs does not stray from that of the original image P2, as the candidate hairstyle image while removing the hairstyle images of the types except the most common type of the front hairs, namely the hairstyle images of the types of the front hairs (hair tips) whose appearance is judged as being less similar to that of the original image P1, and to execute the processing to specify the hairstyle image P1 in view of the characteristics of the whole hairs of the original image P2 after the above processing.

Moreover, since the front hair region F in the hair region is specified with reference to the predetermined positions in the face outline W in the original image P2, the characteristic information of the front hair region F2 can be extracted more easily and more properly.

Furthermore, since the amount of characteristics is extracted as the characteristic information by generating the gradient direction histogram of luminance of the front hair region (hair-tip region) F2, the hairstyle image P1 can be specified by using overall shape information (amount of characteristics) of the front hair region F2, and thereby the natural hairstyle image P2 in which the appearance of the hairstyle does not depart from that of the original image P2 can be specified.

The present invention is not limited to the above embodiments, and various improvements and design changes can be added thereto without departing from the scope and spirit of the present invention.

For example, though the front hair region F2 is illustrated as the hair-tip region in the embodiment, it is a mere example. The present invention is not limited thereto, and can be arbitrary changed. For example, the hair-tip region can be a region including a tip of tail which exists around the side of neck and/or ears while hairs are tied together on the side of the head. In this case, for example, the hair-tip region can be specified by calculating a difference between an average color (representative color) of a background of the face in the original image P2 and an average color of the hairs.

Moreover, though the hairstyle images P1 including the most common type of the front hairs is specified as the candidate hairstyle images among the hairstyle images P1, . . . , each of which corresponds to the characteristic information of the front hair region F2 in the embodiment, it is a mere example of a method for specifying the candidate hairstyle images. The present invention is not limited to the above, and can be arbitrary changed.

Furthermore, though the predetermined number of the candidate hairstyle images are specified on the basis of the characteristic information of the front hair region (hair-tip region) F2, it is a mere example and the present invention is not limited thereto. The candidate hairstyle images do not always need to be specified. It is also possible to specify the hairstyle image P1 corresponding to the characteristic information of the hair-tip region from among the hairstyle images P1, . . . recorded in the image recording unit 5.

Moreover, the front hair region F2 is specified with reference to the predetermined positions in the face outline W in the original image P2 in the embodiment, but it is a mere example of a method for specifying the front hair region F2. The present invention is not limited to the above, and can be arbitrary changed.

Furthermore, though the data in which the shape of the face outline is correlated to the image data of the hairstyle image P1 is used when generating the portrait image P5 in the embodiment, it is a mere example. The present invention is not limited thereto, and can adopt a configuration to specify a face outline image (not illustrated) is specified separately from the hairstyle image P1, for example.

Moreover, though the embodiment generates the face component image P4 which is relevant to the facial principal components in the original image P2 and generates the portrait image P5 by using the face component image P4, the face component image P4 does not always need to be generated. It is possible to arbitrary change whether or not to generate the face component image P4 as needed.

Furthermore, the original images, from which the hairstyle image P1 and/or the face component image P4 are generated, do not need to be an image which represents a frontal face. For example, in the case of an image in which a face is inclined so as to be directed obliquely forward, an image deformed so that a face is directed forward can be generated to be used as the original image.

Moreover, the embodiment adopts the configuration which includes the image recording unit 5 to recode the hairstyle images P1, . . . , but the present invention is not limited thereto. For example, the present invention can adopt a configuration where the hairstyle images P1, are recorded in a predetermined server which can connect to a main body of the imaging apparatus 100 via a predetermined communication network, and the image obtaining unit 6A obtains the hairstyle images P1, . . . from the predetermined server by accessing to the server from not-illustrated communication processing unit via the communication network.

Furthermore, the configuration of the imaging apparatus 100 illustrated in the embodiment is a mere example, and the present invention is not limited thereto. Although the imaging apparatus 100 is illustrated as the image generation apparatus, the image generation apparatus of the present invention is not limited thereto and can have any configuration as long as it can execute the image generating processing of the present invention.

In addition, though the embodiment illustrates the configuration where the image obtaining unit 6A, the characteristic information extracting unit 6F, the hairstyle image specifying unit 6G, and the portrait image generating unit 6H are driven under the control of the central control unit 10, the present invention is not limited thereto, and can have a configuration where a predetermined program and the like are execute by the central control unit 10.

Concretely, a program including an obtaining processing routine, an extracting processing routine, a specifying processing routine, and an image generating processing routine are previously stored in a program memory (not illustrated) for storing the program. It is possible to cause the CPU of the central control unit 10 to function as a section which obtains the original image P2 by the obtaining processing routine. It is also possible to cause the CPU of the central control unit 10 to function as a section which extracts the characteristic information of the hair region in the obtained original image P2 by the extracting processing routine. It is also possible to cause the CPU of the central control unit 10 to function as a section which specifies the hairstyle image P1 on the basis of the extracted characteristic information by the specifying processing routine. It is also possible to cause the CPU of the central control unit 10 to function as a section which generates the portrait image P5 of the face by using the specified hairstyle image P1 by the image generating processing routine.

Similarly to the above, there can be adopted the configuration where the first specifying section, the second specifying section, the outline specifying section, the front hair specifying section, and the second generating section are implemented by executing the predetermined program and the like by the CPU of the central control unit 10.

As a computer-readable medium which stores the programs for executing the above-mentioned respective processes, in addition to the ROM, hard disk, etc., a non-volatile memory such as a flash memory and a portable recording medium such as a CD-ROM can be adopted. As a medium which provides program data via a predetermined communication line, carrier wave can be adopted.

The embodiments of the present invention are described above, but the scope of the present invention is not limited to the above-described embodiments and includes the scope of the invention described in the claims and the scope of the equivalents thereof.

What is claimed is:

1. An image generation apparatus comprising:
a processor which is operable to:
extract characteristic information of a hair-tip region in a face image and characteristic information of an entire hair region in the face image;
specify a predetermined number of candidate hairstyle images from among a plurality of predetermined hairstyle images, based on the extracted characteristic information of the hair-tip region;
select a final hairstyle image from among the specified candidate hairstyle images, based on the extracted characteristic information of the entire hair region; and
generate a portrait image of a face in the face image using the selected final hairstyle image.

2. The image generation apparatus according to claim 1, wherein the processor is further operable to extract characteristic information of a front hair region including a tip of a front hair from the entire hair region, and
wherein the processor specifies hairstyle images including most common styles of front hair as the candidate hairstyle images, from among a plurality of hairstyle images each corresponding to the extracted characteristic information of the front hair region.

3. The image generation apparatus according to claim 2, wherein the processor is further operable to specify a face outline in the face image, and to specify the front hair region based on a predetermined position with respect to the specified face outline, and
wherein the processor extracts the characteristic information of the front hair region specified in the face image.

4. The image generation apparatus according to claim 1, wherein the processor is further operable to extract characteristic information of a front hair region including a tip of a front hair from the entire hair region, and
wherein the processor selects the final hairstyle image based on the extracted characteristic information of the front hair region.

5. The image generation apparatus according to claim 1, wherein the processor is further operable to extract, as the characteristic information of the hair-tip region, a plurality of characteristics obtained by generating a histogram of a luminance gradient direction of the hair-tip region.

6. The image generation apparatus according to claim 1, wherein the processor is further operable to generate a face component image of a facial principal component in the face image, and
wherein the processor generates the portrait image based on the generated face component image and the selected final hairstyle image.

7. A method for generating an image by using an image generation apparatus, the method comprising:
extracting characteristic information of a hair-tip region in a face image and characteristic information of an entire hair region in the face image;
specifying a predetermined number of candidate hairstyle images from among a plurality of predetermined hairstyle images, based on the extracted characteristic information of the hair-tip region;
selecting a final hairstyle image from the specified candidate hairstyle images, based on the extracted characteristic information of the entire hair region; and
generating a portrait image of a face in the face image by using the selected final hairstyle image.

8. A non-transitory recording medium having recorded thereon a program readable by a computer of an image generation apparatus, the program being executable to control the computer to perform functions comprising:

extracting characteristic information of a hair-tip region in a face image and characteristic information of an entire hair region in the face image;

specifying a predetermined number of candidate hairstyle images from among a plurality of predetermined hairstyle images, based on the extracted characteristic information of the hair-tip region;

selecting a final hairstyle image from among the specified candidate hairstyle images, based on the extracted characteristic information of the entire hair region; and generating a portrait image of a face in the face image using the selected final hairstyle image.

* * * * *